(12) United States Patent
Bowdle

(10) Patent No.: US 8,417,975 B2
(45) Date of Patent: Apr. 9, 2013

(54) MOTION TRIGGERED MAGNETIC READING AND COMPASS HEADING CALCULATIONS TO REDUCE POWER CONSUMPTION

(75) Inventor: Aaron Bowdle, Adair Village, OR (US)

(73) Assignee: Trimble Navigation Limited, Sunnyvale, CA (US)

( * ) Notice: Subject to any disclaimer, the term of this patent is extended or adjusted under 35 U.S.C. 154(b) by 550 days.

(21) Appl. No.: 12/625,301

(22) Filed: Nov. 24, 2009

(65) Prior Publication Data

US 2011/0121892 A1    May 26, 2011

(51) Int. Cl.
G06F 1/00  (2006.01)
G06F 1/26  (2006.01)
G06F 1/32  (2006.01)
G01C 17/00 (2006.01)

(52) U.S. Cl. ........ 713/320; 713/300; 713/323; 701/400; 73/1.76

(58) Field of Classification Search .......... None
See application file for complete search history.

(56) References Cited

U.S. PATENT DOCUMENTS

| | | | |
|---|---|---|---|
| 6,728,632 B2 | 4/2004 | Medl | |
| 7,142,870 B2 * | 11/2006 | Kim | 455/456.1 |
| 7,159,326 B2 * | 1/2007 | Linjama | 33/356 |
| 7,176,888 B2 | 2/2007 | Marvit et al. | |
| 7,280,096 B2 | 10/2007 | Marvit et al. | |
| 7,301,528 B2 | 11/2007 | Marvit et al. | |
| 7,489,249 B2 * | 2/2009 | Better et al. | 340/573.1 |
| 7,536,201 B2 | 5/2009 | Dunko | |
| 7,606,552 B2 * | 10/2009 | Orr et al. | 455/343.1 |
| 7,633,389 B2 * | 12/2009 | Mantovani et al. | 340/539.3 |
| 2003/0119529 A1 | 6/2003 | Hirokawa | |
| 2003/0164822 A1 | 9/2003 | Okada | |
| 2003/0210143 A1 * | 11/2003 | Haddad | 340/539.13 |
| 2003/0222889 A1 | 12/2003 | Parulski et al. | |
| 2004/0051702 A1 | 3/2004 | Taniguchi et al. | |
| 2004/0105573 A1 | 6/2004 | Neumann et al. | |
| 2004/0192352 A1 * | 9/2004 | Vallstrom et al. | 455/456.6 |
| 2005/0155240 A1 | 7/2005 | Kwon et al. | |
| 2006/0019706 A1 | 1/2006 | Ho et al. | |
| 2007/0024578 A1 | 2/2007 | Lundquist | |
| 2007/0107518 A1 | 5/2007 | Cromer et al. | |
| 2007/0192691 A1 | 8/2007 | Inazumi | |
| 2008/0234930 A1 * | 9/2008 | Cheok et al. | 701/207 |
| 2010/0106411 A1 * | 4/2010 | Nirhamo et al. | 701/209 |
| 2010/0171642 A1 * | 7/2010 | Hassan et al. | 340/992 |

\* cited by examiner

Primary Examiner — Ji H Bae

(57) ABSTRACT

A method for reducing power consumption of an electronic device is disclosed. In one embodiment, an indication that an electronic device is oriented in a first orientation is received. An indication of rotation of the electronic device around an axis is received. A command is then generated to cause an electronic compass module disposed within the electronic device to transition from an idle operating state to an active operating state and to generate a compass heading.

23 Claims, 5 Drawing Sheets

MOTION TRIGGERED MAGNETIC READING AND COMPASS HEADING CALCULATIONS TO REDUCE POWER CONSUMPTION

FIELD OF THE INVENTION

Embodiments are related to the field of navigation devices.

BACKGROUND

A wide variety of devices utilize electronic compasses. These include surveying devices, Geographic Information System (GIS) data collectors, handheld navigation devices, automobile navigation devices, and even wristwatches.

Typically, an electronic compass module detects variations in the Earth's magnetic field to determine its heading. However, conversion of the data received by the electronic compass module into a usable heading often necessitates numerous floating point mathematical computations. Also, generating a heading often involves collecting more than one measurement of the Earth's magnetic field and an averaging of the values to generate the heading. Often, applications which utilize a compass heading will poll the electronic function often for heading updates. For example, an automotive navigation system may poll the electronic compass module every second. Thus, the frequent polling for compass headings can result in constant, or near constant, operation of the electronic compass module.

SUMMARY

A method for reducing power consumption of an electronic device is disclosed. In one embodiment, an indication that an electronic device is oriented in a first orientation is received. An indication of rotation of the electronic device around an axis is received. A command is then generated to cause an electronic compass module disposed within the electronic device to transition from an idle operating state to an active operating state and to generate a compass heading.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "storing," "determining," "generating," "accessing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
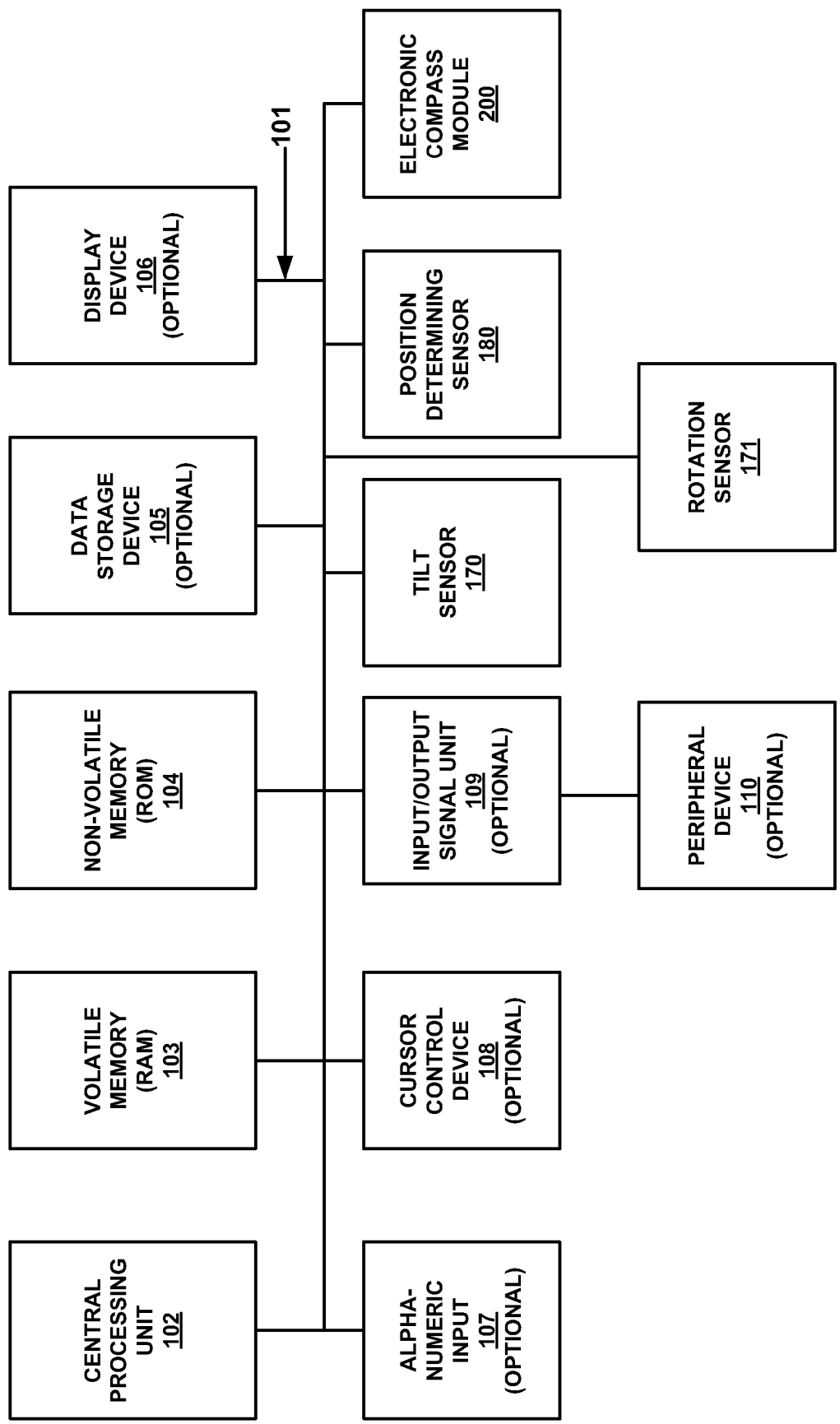
FIG. 1A is a block diagram of an electronic device which implements a method for reducing power consumption in accordance with one embodiment.

With reference to FIG. 1A, electronic device 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, electronic device 100 may also include a data storage device 105 (e.g., a magnetic, optical, floppy, or tape drive or the like) for storing vast amounts of data. It should be noted that computer executable code for reducing power consumption in an electronic device can be stored either in volatile memory 103, data storage device 105, or in an external storage device (not shown).

Devices which are optionally coupled to electronic device 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Electronic device 100 can also include a mechanism for emitting an audible signal (not shown).

Returning still to FIG. 1A, optional display device 106 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Furthermore, electronic device 100 can include an input/output (I/O) signal unit (e.g., interface) 109 for interfacing with a peripheral device 110 (e.g., a computer network, modem, mass storage device, etc.).

In the embodiment of FIG. 1A, electronic device 100 further comprises a tilt sensor 170 which is used to determine when electronic device 100 is in a substantially horizontal orientation with reference to the Earth's surface. In one embodiment, tilt sensor 170 is a three axis sensor which can determine orientation of electronic device 100 in an x-axis, y-axis, and z-axis. In one embodiment, when electronic device 100 is in what is referred to as the substantially horizontal position, the x-axis and y-axis are substantially parallel with the surface of the Earth while the z-axis is aligned along the axis through the gravitational center of the Earth.

In the embodiment of FIG. 1A, electronic device 100 further comprises a rotation sensor 171. In one embodiment rotation sensor 171 is configured to detect when electronic device 100 is being moved. In one embodiment, rotation sensor 171 is a two-axis accelerometer which is configured to detect when electronic device 100 is being rotated around an axis. In various embodiments, determining that electronic device 100 is being rotated is interpreted as an indication that a user is attempting to operate electronic device 100. As will be described in greater detail, this indication is used to trigger transitioning electronic compass module 200 and/or other components of electronic device 100 to an active operating state.

In the embodiment of FIG. 1A, electronic device 100 further comprises a position determining component 180 for determining the geographic position of electronic device 100. For example, position determining component 180 is configured to determine the latitude and longitude of electronic device 100 in one embodiment. However, embodiments of the present technology are not limited to describing the geographic position of electronic device 100 in terms of latitude and longitude alone. In other words, the geographic position of electronic device 100 can be described using some other reference system and can include the altitude of electronic device 100 as well. It is further noted that electronic device 100 is not required to have a position determining component 180 in accordance with various embodiments.

Figure 1B:
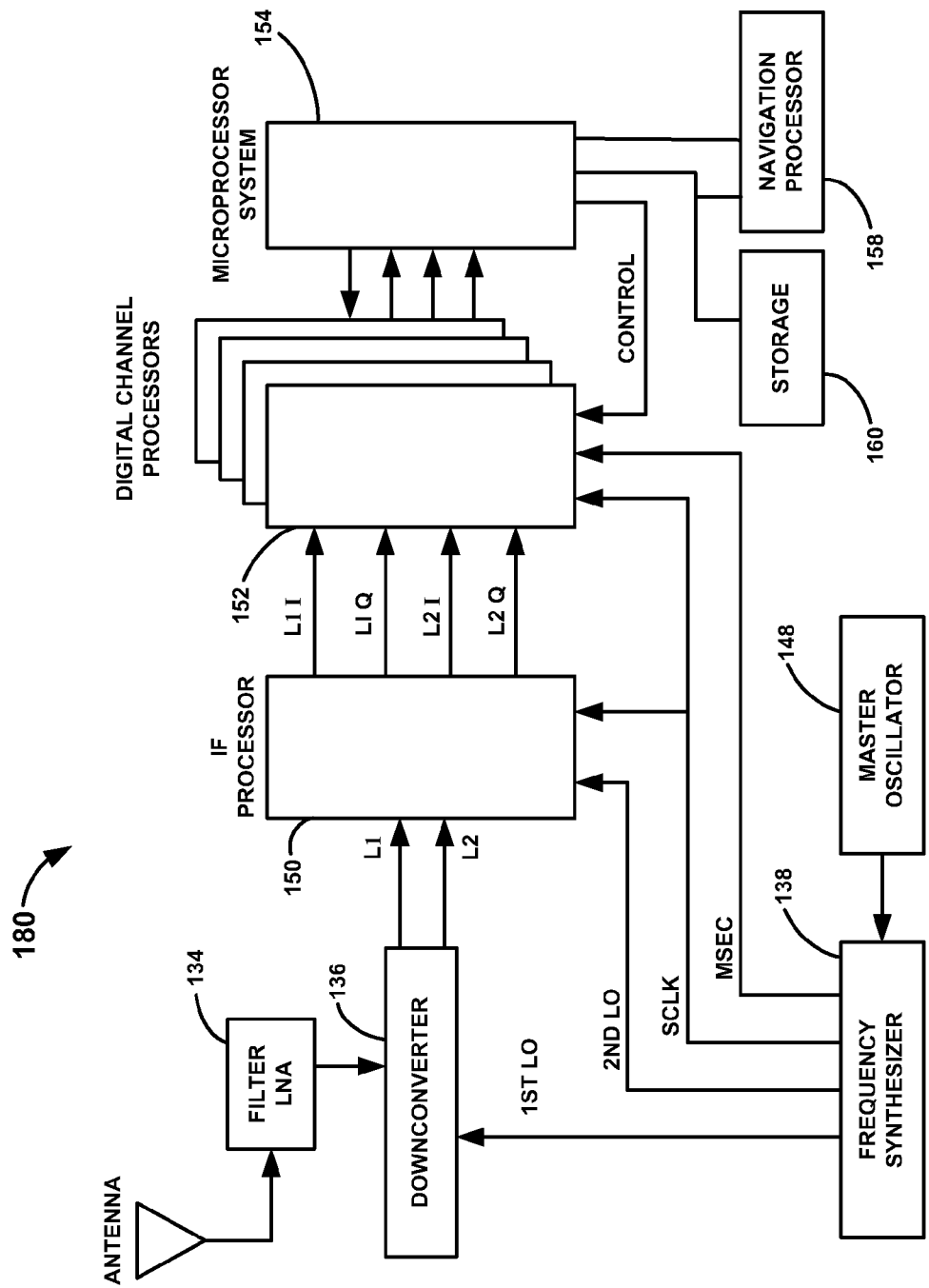
FIG. 1B is a block diagram of a position determining component used in accordance with one embodiment.

With reference now to FIG. 1B, a block diagram is shown of an embodiment of an example position determining component 180 which may be used in accordance with various embodiments described herein. In particular, FIG. 1B illustrates a block diagram of a GNSS receiver capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments of the present technology may be utilized by GNSS receivers which access the L1 signals alone, or in combination with the L2 signal(s). A more detailed discussion of the function of a receiver such as GPS receiver 180 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 180 of FIG. 1B.

In FIG. 1B, received L1 and L2 signal is generated by at least one GPS satellite. Each GPS satellite generates different signal L1 and L2 signals and they are processed by different digital channel processors 152 which operate in the same way as one another. FIG. 1B shows GPS signals (L1=1575.42 MHz, L2=1227.60 MHz) entering GPS receiver 180 through a dual frequency antenna. Master oscillator 148 provides the reference oscillator which drives all other clocks in the system. Frequency synthesizer 138 takes the output of master oscillator 148 and generates important clock and local oscillator frequencies used throughout the system. For example, in one embodiment frequency synthesizer 138 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 134 performs filtering and low noise amplification of both L1 and L2 signals. The noise figure of GPS receiver 180 is dictated by the performance of the filter/LNA combination. The downconverter 136 mixes both L1 and L2 signals in frequency down to approximately 175 MHz and outputs the analogue L1 and L2 signals into an IF (intermediate frequency) processor 30. IF processor 150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 152 inputs the digitally sampled L1 and L2 inphase and quadrature signals. All digital channel processors 152 are typically are identical by design and typically operate on identical input samples. Each digital channel processor 152 is designed to digitally track the L1 and L2 signals produced by one satellite by tracking code and carrier signals and to form code and carrier phase measurements in conjunction with the microprocessor system 154. One digital channel processor 152 is capable of tracking one satellite in both L1 and L2 channels. Microprocessor system 154 is a general purpose computing device which facilitates tracking and measurements processes, providing pseudorange and carrier phase measurements for a navigation processor 158. In one embodiment, microprocessor system 154 provides signals to control the operation of one or more digital channel processors 152. Navigation processor 158 performs the higher level function of combining measurements in such a way as to produce position, velocity and time information for the differential and surveying functions. Storage 160 is coupled with navigation processor 158 and microprocessor system 154. It is appreciated that storage 160 may comprise a volatile or non-volatile storage such as a RAM or ROM, or some other computer readable memory device or media.

Figure 2:
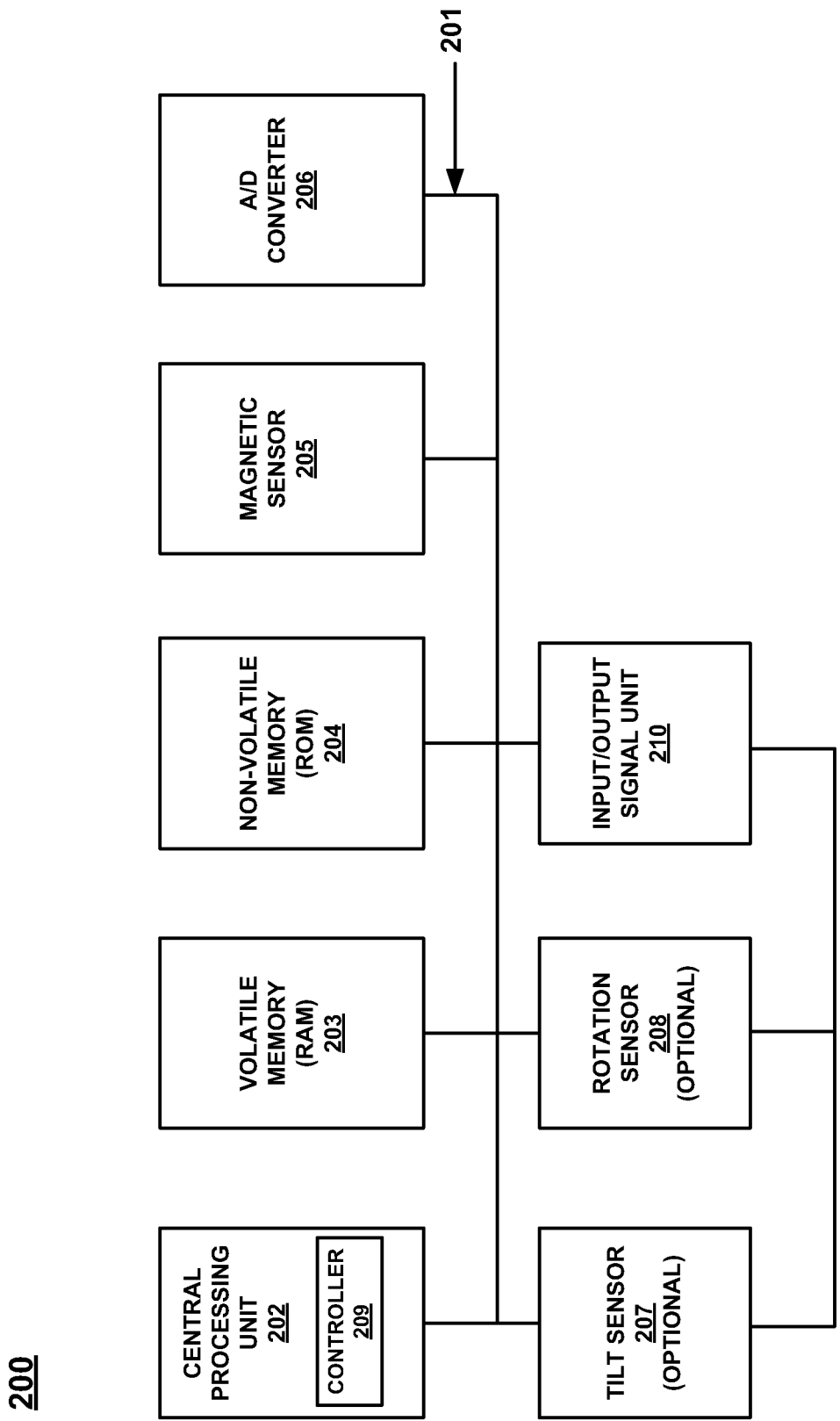
FIG. 2 is a block diagram of an electronic compass module used in accordance with one embodiment.

FIG. 2 is a block diagram on an example electronic compass module 200 used in embodiments of the present technology. In one embodiment, electronic compass module 200 comprises a processor 202 coupled with a bus 201 which is configured for conveying digital information between the various components. Processor 202 is configured for processing digital information and instructions used to generate a compass heading and for providing compass heading data to hardware and software components of electronic device 100. Electronic compass module 200 further comprises a volatile memory component 203 for storing digital data and instructions. In the embodiment of FIG. 2, electronic compass module 200 further comprises a non-volatile memory 204 for storing data of a more permanent nature.

Electronic compass module 200 further comprises a magnetic sensor 205 which is configured to generate a signal based upon the relative geomagnetic alignment of electronic device 100 with the Earth's magnetic field. It is noted that there are a variety of commercially available magnetic sensors which can be used to determine the geomagnetic alignment of electronic device 100 in various embodiments. In FIG. 2, electronic compass module 200 further comprises an analog to digital converter for converting signals from magnetic sensor 205 into digital signals which are usable by processor 202. In the embodiment of FIG. 2, an optional tilt sensor 207 is used to determine when electronic device 100 is in a substantially horizontal orientation with reference to the Earth's surface. In one embodiment, tilt sensor 207 is a three axis sensor which can determine orientation of electronic device 100 in an x-axis, y-axis, and z-axis. In one embodiment, when electronic device 100 is in what is referred to as the substantially horizontal position, the x-axis and y-axis are substantially parallel with the surface of the Earth while the z-axis is aligned along the axis through the gravitational center of the Earth.

In the embodiment of FIG. 2, electronic compass module 200 further comprises an optional rotation sensor 208. In one embodiment rotation sensor 208 is configured to detect when electronic device 100 is being moved. In one embodiment, rotation sensor 208 is a two-axis accelerometer which is configured to detect when electronic device 100 is being rotated around an axis. In various embodiments, determining that electronic device 100 is being rotated is interpreted as an indication that a user is attempting to operate electronic device 100. As will be described in greater detail, this indication is used to trigger transitioning electronic compass module 200 and/or electronic device 100 to an active operating state. In the embodiment of FIG. 2, electronic compass module 200 further comprises a controller 209 which is resident within processor 202. Controller 209 comprises computer executable code which is read from, for example, volatile memory 203 or non-volatile memory 204 and is implemented by processor 202. In one embodiment, controller 209 is used to implement a method of reducing power consumption in electronic device 100 in accordance with various embodiments. Additionally, electronic compass module 200 comprises a power controller 210 which is communicatively coupled with processor 202. In various embodiments, power controller 210 selectively couples magnetic sensor 205 with a power source (not shown) in response to commands generated by controller 209.

It is noted that various components of electronic compass module 200 and/or electronic device 100 have been omitted for the sake of brevity. Additionally, it is noted that other configurations of electronic device 100 and electronic compass module 200 are in accordance with embodiments of the present technology. For example, components of electronic compass module (e.g., processor 202, volatile memory 203, non-volatile memory 203, tilt sensor 207, rotation sensor 208, controller 209, and power controller 210) may be implemented as components of electronic device 100 rather than components of electronic compass module 200.

Figure 3:
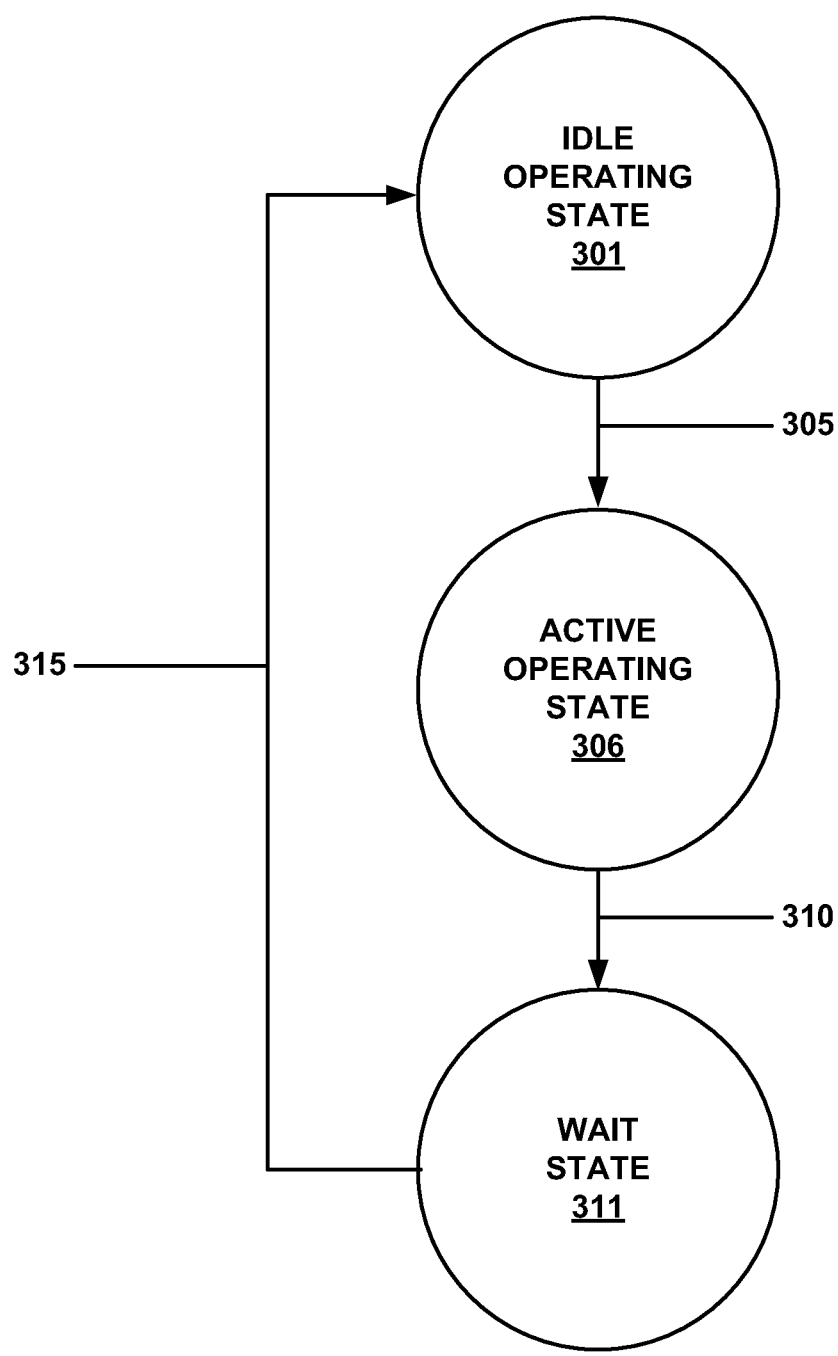
FIG. 3 is a diagram showing operating states of an electronic compass module in accordance with one embodiment.

FIG. 3 is a diagram showing operating states of an electronic compass module in accordance with one embodiment. In one embodiment, the only components of electronic compass module 200 which are drawing power when electronic compass module 200 is in idle operating state 301 are processor 202 and tilt sensor 207. In another embodiment, rotation sensor 208 may also be drawing power when electronic compass module 200 is in idle state 301. In particular, it is noted that magnetic sensor 205 is uncoupled from a power source due to commands from controller 209 which cause power controller 210 to de-couple magnetic sensor 205 from the power supply. This allows electronic compass module 200 to draw a minimal amount of power. This can significantly improve the battery life for portable electronic devices (e.g., electronic device 100) in which electronic compass module 200 is disposed. It is noted that tilt sensor 207 and rotation sensor 208 may be components of electronic device 100 in one embodiment. In other words, processor 102, tilt sensor 207 and rotation sensor 208 may be drawing power in idle state 301 while electronic compass module 200 is entirely de-coupled from the power source.

At event 305, electronic compass module 200 transitions to active operating state 306. In one embodiment, when electronic compass module 200 transitions to active operating state 306, controller 209 generates a command to power controller 210 to couple magnetic sensor 205 with the power source. There are a variety of events which can trigger transitioning to active operating state 306 in accordance with embodiments of the present technology. For example, when a user is operating electronic device and is, for example, aligning a map with magnetic North, the user will typically align electronic device 100 to point to magnetic North on the map and turn his body until electronic device 100 indicates that the user is facing North.

In one embodiment, tilt sensor 207 generates a signal to controller 209 which indicates that electronic device 100 is oriented in a first orientation. As an example, in one embodiment determining that electronic device is oriented in a substantially horizontal position such as when a user may be attempting to align electronic device 100. However, it is not a necessity to orient electronic device 100 in a substantially horizontal position in accordance with various embodiments. For example, a user may have electronic device 100 mounted on a tripod at an angle which permits easier viewing and operation. In one embodiment, when electronic device is substantially maintained in a given orientation for a predetermined time interval (e.g., 3 seconds), controller 209 will use that orientation as a reference for further measurements. Additionally, rotation sensor 208 generates a signal to controller 209 which indicates that electronic device 100 is being rotated. In one embodiment, the axis of rotation is centered within electronic device 100 itself. In other words, rotation of electronic device 100 alone is detected by rotation sensor 208. In another embodiment, rotation sensor 208 is configured to detect rotation of electronic device 100 around an axis outside of electronic device 100. For example, a user holding electronic device 100 may rotate his entire body, rather than just electronic device 100, in order to align electronic device. In one embodiment, the accelerometer(s) of rotation sensor 208 can detect this rotation and generate a signal to controller 209 indicating rotation of electronic device 100. In one embodiment, when controller 209 receives these indications, it generates a signal to power controller 210 which causes it to couple magnetic sensor 205 with the power source. In so doing, magnetic sensor 205 will then operate to indicate the direction of magnetic North. Controller 209 is then able to determine the direction in which electronic device is pointed and generate a heading for the user based upon data received from magnetic sensor 205.

In one embodiment, electronic compass module 200 automatically stores the generated heading (e.g., in non-volatile memory 203). Alternatively, the generated heading may be cached in processor 102 or 202. In one embodiment, while electronic compass module determines that new headings are being generated, it will remain in a polling mode to gather heading information at pre-determined time intervals. It is noted that the polling interval can be shortened such that electronic compass module 200 is essentially generating continuous real-time headings. In one embodiment, each time a new heading is generated by electronic compass module 200 it is then stored as described above. The stored heading information can then be accessed by other applications which request this data.

In one embodiment, rotation sensor 208 is not coupled with the power source when electronic compass module 200 is in idle operating state 301. When tilt sensor 207 generates a signal to controller 209 indicating that electronic device 100 is oriented in a substantially horizontal position, controller 209 generates a signal to power controller 210 causing it to couple rotation sensor 208 to the power source. At this point, operation of electronic compass module 200 proceeds as discussed above.

In another embodiment, electronic device 100 may be powered down during idle operating state 301. In response to a signal from tilt sensor 207, or the combination of signals from tilt sensor 207 and rotation sensor 208, controller 209 can initiate a start-up procedure which causes electronic device 100 to transition to an active operating state.

In another embodiment, response to a signal from tilt sensor 207, or the combination of signals from tilt sensor 207 and rotation sensor 208, controller 209 can initiate a procedure which causes position determining component 180 to transition from a suspended operating state to an active operating state and to automatically begin the process of generating a position fix for electronic device 100. In one embodiment, position determining component automatically stored the position fix (e.g., in memory 103, data storage device 105, or storage 160).

In operation 310 of FIG. 3, electronic compass module 200 enters a wait state 311. In one embodiment, electronic compass module 200 returns to idle operating state 301 after a pre-determined time period has elapsed. For example, controller 209 will generate a command to power controller 210 to de-couple magnetic sensor 205 from the power source when the pre-determined time period has elapsed if there is no indication of rotation of electronic device, or if it is determined that electronic device is no longer in a substantially horizontal position. In one embodiment, if controller 209 determines that the pre-determined time period has elapsed, it causes electronic compass module 200 to re-enter idle operating state 301 in operation 315. In one embodiment, after heading information has been stored (e.g., in non-volatile memory 203 or in cache memory of processor 202, controller 209 will wait for the pre-determined time period. If it is determined that electronic device 100 has not been rotated in the pre-determined time period, controller 209 will automatically return to idle operating state 301. As described above, rotation sensor 208 may also be de-coupled from the power source in idle operating state 301. In another embodiment, a user may select the option of putting electronic device 100 into a sleep mode. In response to such an indication, controller 209 will again generate a command to power controller 210 to de-couple the appropriate components from the power source.

As described above, electronic compass module 200 can store a compass heading for later access by applications which request heading information. As a result, a reduction in the operation of magnetic sensor 205 and of processor 202 can be realized in various embodiments. As an example, unless controller 209 determines that electronic device 100 is aligned on a different heading since the storing of a compass heading, it can keep electronic compass module 200 in the idle operating state 301. When an application then requests a heading, the request is directed to controller 209 which accesses the stored heading information. Again, this information can be stored in memory (e.g., 103 of FIG. 1A, or 203 of FIG. 2) or in cache memory. In other words, when an application requests heading information, controller 209 will access the stored heading information and provide it to the requesting application unless electronic device 100 has been rotated subsequent to the storing of the heading data. As a result, processor 202 will generate a reply to the request for a heading comprising the stored heading information.

Figure 4:
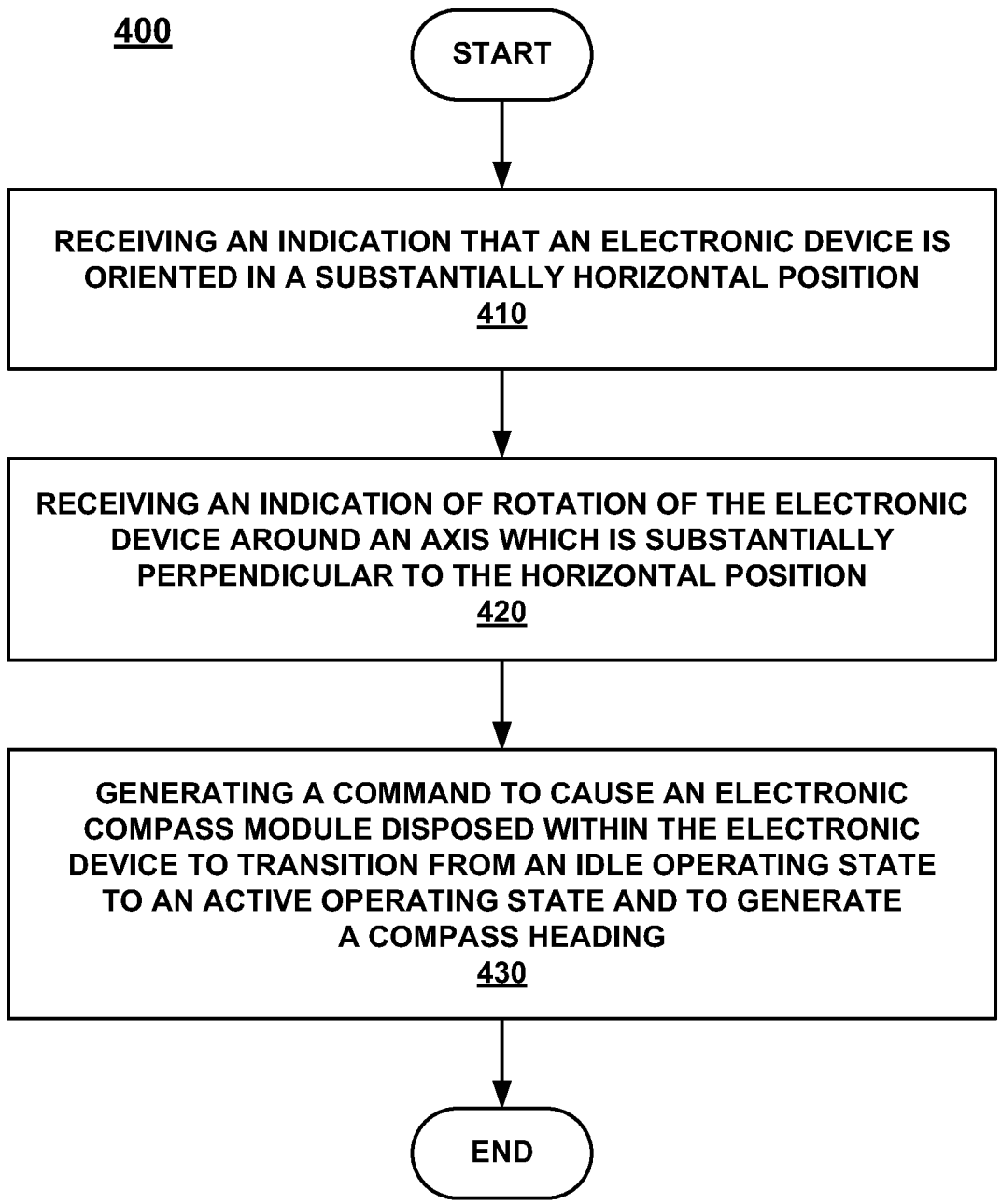
FIG. 4 is a flowchart of a method for reducing power consumption of an electronic device in accordance with one embodiment.

FIG. 4 is a flowchart of a method 400 of reducing power consumption of an electronic device in accordance with various embodiments. In operation 410 of FIG. 4, an indication is received that an electronic device (e.g., 100 of FIG. 1A) is oriented in a first orientation. As discussed above, tilt sensor 207 is operable for determining the orientation of electronic device 100. In one embodiment, when electronic device is substantially maintained in a given orientation for a pre-determined time interval (e.g., 3 seconds), controller 209 will use that orientation as a reference for further measurements. In one embodiment, when controller 209 has determined a reference orientation for electronic device 100, it generates a message to power controller 210 which causes it to couple rotation sensor 208 with a power source. In one embodiment, when electronic device 100 is oriented so that the z-axis is within a pre-determined parameter, controller 209 is configured to determine that electronic device 100 is oriented in a substantially horizontal position. In one embodiment, when controller 209 determines that electronic device 100 is oriented in a substantially horizontal position, it generates a message to power controller 210 which causes it to couple rotation sensor 208 with a power source.

In operation 420 of FIG. 4, an indication is received of the rotation of the electronic device around an axis. In response to receiving an indication from rotation sensor 208 of the rotation of electronic device 100, controller 209 determines that electronic device 100 may be used to generate a compass bearing. As a result, controller 209 will cause electronic device 100, or components thereof, to transition from an idle operating state, in which minimal power is being drawn from a power source, to an active operating state.

In operation 430 of FIG. 4, a command is generated to cause an electronic compass module (e.g., 200 of FIG. 2) disposed within the electronic device to transition from an idle operating state to an active operating state and to generate a compass heading. As described above, controller 209 generates a command to power controller 210 which causes it to couple magnetic sensor 205 with a power source. In one embodiment, controller 209 generates this command to power controller 210 in response to the indication of the substantially horizontal orientation of electronic device 100 and to an indication or the rotation of the electronic device around an axis (e.g., the z-axis).

Embodiments of the present technology are thus described. While the present technology has been described in particular embodiments, it should be appreciated that the present technology should not be construed as limited to these embodiments alone, but rather construed according to the following claims.

What is claimed is:

1. A method of reducing power consumption of an electronic device, said method comprising:

determining a first orientation of an electronic device;

coupling a rotation sensor with a power source in response to said determining;
receiving an indication of rotation of said electronic device around an axis; and
generating a command to cause an electronic compass module disposed within the electronic device to transition from an idle operating state to an active operating state and to generate a compass heading in response to said indication of rotation.

2. The method as recited in claim 1 further comprising:
receiving an indication that said electronic device is oriented in a substantially horizontal position; and
receiving an indication of rotation of said electronic device around an axis which is substantially orthogonal to said horizontal position.

3. The method as recited in claim 1 further comprising:
storing the compass heading; and
generating a command to cause said electronic compass module to return to said idle operating state.

4. The method as recited in claim 3 further comprising:
receiving a request for a compass heading;
determining that said electronic device has not rotated around said axis subsequent to said storing of said compass heading; and
accessing the stored compass heading in response to said request.

5. The method as recited in claim 3 further comprising:
determining that said electronic device has not been rotated around said axis for a pre-determined time period subsequent to the storing of the compass heading.

6. The method as recited in claim 1 further comprising:
generating a message for causing a position determining component communicatively coupled with said electronic compass module to transition from a suspended operating state to an active operating state.

7. The method as recited in claim 6 further comprising:
automatically generating a position fix of said electronic device in response to transitioning from said suspended operating state to said active operating state.

8. The method as recited in claim 7 further comprising:
storing said position fix of said electronic device.

9. A non-transitory computer readable storage medium having computer readable code stored thereon for causing an electronic device to implement a method for reducing power consumption, said method comprising:
determining a first orientation of an electronic device;
coupling a rotation sensor with a power source in response to said determining;
receiving an indication of rotation of said electronic device around an axis; and
generating a command to cause an electronic compass module disposed within the electronic device to transition from an idle operating state to an active operating state and to generate a compass heading in response to said indication of rotation.

10. The non-transitory computer readable storage medium as recited in claim 9, wherein said method further comprises:
receiving an indication that said electronic device is oriented in a substantially horizontal position; and
receiving an indication of rotation of said electronic device around an axis which is substantially orthogonal to said horizontal position.

11. The non-transitory computer readable storage medium as recited in claim 9, wherein said method further comprises:
storing the compass heading; and
generating a command to cause said electronic compass module to return to said idle operating state.

12. The non-transitory computer readable storage medium as recited in claim 11 wherein said method further comprises:
receiving a request for a compass heading;
determining that said electronic device has not rotated around said axis subsequent to said storing of the compass heading; and
accessing the stored compass heading in response to said request.

13. The non-transitory computer readable storage medium as recited in claim 11 wherein said method further comprises:
determining that said electronic device has not been rotated around said axis for a pre-determined time period subsequent to the storing of the compass heading.

14. The non-transitory computer readable storage medium as recited in claim 9 wherein said method further comprises:
generating a message for causing a position determining component communicatively coupled with said electronic compass module to transition from a suspended operating state to an active operating state.

15. The non-transitory computer readable storage medium as recited in claim 14 wherein said method further comprises:
automatically generating a position fix of said electronic device in response to transitioning from said suspended operating state to said active operating state.

16. The non-transitory computer readable storage medium as recited in claim 15 wherein said method further comprises:
storing said position fix of said electronic device.

17. A system for reducing the power consumption of an electronic device comprising:
a tilt sensor for determining that an electronic device is oriented in a first orientation;
a rotation sensor for determining rotation of said electronic device around an axis; and
a controller communicatively coupled with said tilt sensor and with said rotation sensor, said controller configured to couple said rotation sensor with a power source in response to said determining that said electronic device is oriented in a first orientation and to cause an electronic compass module disposed within the electronic device to transition from an idle operating state to an active operating state and to generate a compass heading in response to an indication of rotation of said electronic device around an axis.

18. The system as recited in claim 17, wherein said tilt sensor is configured to indicate that said electronic device is oriented in a substantially horizontal position and said rotation sensor is configured to indicate rotation of said electronic device around an axis which is substantially orthogonal to said horizontal position.

19. The system as recited in claim 17, further comprising:
a data storage component for storing the compass heading.

20. The system as recited in claim 19 wherein said controller is further configured to determine that said electronic device has not been rotated around said axis subsequent to receiving a request for a compass heading and to generate a reply to said request comprising the stored compass heading.

21. The system as recited in claim 17 wherein said controller is further configured to automatically generate a command to cause said electronic compass module to return to said idle operating state in response to determining that said electronic device has not been rotated around said axis for a pre-determined time period subsequent to the storing of the compass heading.

22. The system as recited in claim 17 further comprising:
a position determining component communicatively coupled with said controller and wherein said controller is further configured to generate a message for causing said position determining component to transition from a suspended operating state to an active operating state.

23. The system as recited in claim 22 wherein said position determining component is configured to automatically generate a position fix in response to said transitioning to an active operating state and wherein said controller is configure to initiate storing said position fix.

\* \* \* \* \*